(12) United States Patent
Welle, IV

(10) Patent No.: US 10,131,773 B2
(45) Date of Patent: Nov. 20, 2018

(54) PERMEABLE MATERIAL

(71) Applicant: Richard K. Welle, IV, Centennial, CO (US)

(72) Inventor: Richard K. Welle, IV, Centennial, CO (US)

(73) Assignee: Rubberosion, Inc., Hudson, CO (US)

( * ) Notice: Subject to any disclaimer, the term of this patent is extended or adjusted under 35 U.S.C. 154(b) by 304 days.

(21) Appl. No.: 14/620,889

(22) Filed: Feb. 12, 2015

(65) Prior Publication Data
US 2016/0237260 A1 Aug. 18, 2016

(51) Int. Cl.
*C08L 17/00* (2006.01)

(52) U.S. Cl.
CPC ........... *C08L 17/00* (2013.01); *C08L 2207/20* (2013.01)

(58) Field of Classification Search
CPC .............................. C08L 17/00; C08L 2207/20
USPC .................................................. 428/403, 407
See application file for complete search history.

(56) References Cited

U.S. PATENT DOCUMENTS

| | | | |
|---|---|---|---|
| 8,043,498 B2 | 10/2011 | Rueda | |
| 8,051,568 B2 | 11/2011 | Moody et al. | |
| 8,216,453 B2 | 7/2012 | Moody et al. | |
| 8,535,523 B2 | 9/2013 | Friezner et al. | |
| 8,679,328 B2 | 3/2014 | Hebert | |
| 2006/0222458 A1* | 10/2006 | Grimes | E01C 11/223 404/2 |
| 2008/0247829 A1* | 10/2008 | Sine | E02D 29/0233 405/262 |
| 2009/0101591 A1 | 4/2009 | Lewis | |
| 2011/0049027 A1 | 3/2011 | Rueda | |
| 2012/0329934 A1* | 12/2012 | Bower | C03C 12/00 524/425 |
| 2014/0021144 A1 | 1/2014 | Lane | |
| 2014/0235781 A1* | 8/2014 | Bower | C03C 12/00 524/493 |

* cited by examiner

*Primary Examiner* — Leszek B Kiliman
(74) *Attorney, Agent, or Firm* — Brownstein Hyatt Farber Schreck, LLP

(57) ABSTRACT

Rubber crumb from recycled automotive or truck tires or other rubber products is used to produce a material which is water and gas permeable. This material may be used for erosion control structures in place of, or in addition to, standard rock socks, straw wattle, or other erosion control configurations. The rubber crumb material may be used to produce growing containers for plants and children's blocks or other children's toys. A method for combining rubber crumb with a binder to produce various configurations of erosion control structures, growing containers and children's toys is also disclosed.

21 Claims, 10 Drawing Sheets

PERMEABLE MATERIAL

TECHNICAL FIELD

The disclosure relates to materials made from recycled rubber products such as automotive tires. More particularly, the disclosure relates to material made from crumb rubber chips generated during the tire recycling process. In still greater particularity, the disclosure relates to combining crumb rubber with a binder to produce a material that is liquid and gas permeable which may be used in a variety of applications such as, for example, erosion control products, plant growing containers, and children's toys.

BACKGROUND

Automotive and truck tires may be recycled and processed into "crumb" rubber or rubber chips. During the recycling process, the steel belts and tire cord, sometimes known as "fluff", is removed leaving particles of rubber with a granular consistency. The steel and fiber removed during the process may also be recycled. The granular particles of crumb rubber have been used in asphalt base, artificial turf base, athletic field cover, beneath playground equipment and in other products as a cushioning material.

Crumb rubber may be provided by recycling operations in various sizes. The crumb rubber granulate is passed through a screen with a known number of holes per inch. For example, size 10 crumb rubber has been passed through a screen with 10 holes per inch such that, depending upon the gauge of wire used in the screen, the size of the rubber granulate passing through the screen is slightly less than one-tenth of an inch. Similarly, size 20 crumb rubber passes through a screen with 20 holes per inch and has a size slightly less than one-twentieth of an inch. Size 2 crumb rubber would be slightly smaller than one-half inch having been passed through a screen with 2 holes per inch.

Crumb rubber may generally be graded or classified on a scale of 1 through 5 according to standard industry practice. No. 1 crumb rubber is granulated tire crumb which is black only (white portions/sidewalls are not included), metal free (but not magnetically separated) and with the "fluff" from tire cord removed. No. 2 crumb rubber may include white sidewalls portions. No. 3 crumb rubber may include black crumb only but may be magnetically separated from metal particles. No. 4 may be black and white crumb which has been magnetically separated and No. 5 may be unseparated and include fluff. Thus No. 1 crumb is preferred for some applications while No. 5 crumb may be used for applications not requiring a clean material In many construction sites, government environmental regulations require some form of temporary erosion control to prevent or mitigate soil, rock or other debris which has been displaced by construction activities from being carried by water or other liquids into storm water drains or other water drainage areas such as lakes and streams. Such sediment control program may sometimes be referred to as a "BMP" or Best Management Practice. In many situations, fiber rolls or straw "wattle" have been used as a BMP. In a fiber roll, straw, coconut fiber or similar material is bound between plastic mesh and made into sheets or tubular rolls of material. The fiber rolls trap sediment and may be used in place of straw bales or sand bags, which have also been sometimes used. Another commonly used tool is the "rock sock" which is a water permeable cloth enclosure containing rock or gravel.

Straw wattle suffers from being non-reusable and may fall apart or decompose, especially when wet. While lightweight when dry, it becomes much heavier when liquids such as water are absorbed by the straw which also makes the straw wattle prone to break apart and complicate its relocation or reuse. In situations where straw wattle is used on roadways, vehicle traffic may contribute to breaking apart of the relatively fragile straw wattle. Because straw wattle is relatively lightweight when dry, it may be carried away by wind, foot or vehicle traffic, or an initial high liquid flow unless properly secured or staked into the ground. In situations where used on hard surfaces, such as paved streets, straw wattle must be anchored by other means, such as sand bags or concrete blocks, to avoid being carried off by liquid flow, wind, or pedestrian or vehicle traffic.

Straw wattle, rock socks and sandbags are also limited because they may be difficult, or impossible, to clean once they have been infused with sediment or other debris from water runoff. They are thus generally limited to one-time use which can make their use more expensive. They also present a disposal problem in that they must be properly disposed of once they have served their purpose of capturing sediment or other debris. In the case of rock socks, the rock must be removed and the material enclosure must be replaced once it is worn or cannot be cleaned. The rock must then be placed into a new or cleaned synthetic or cloth "sock" which may be time consuming and impractical.

SUMMARY

Rubber crumb portions from recycled automotive or truck tires or other rubber products are bound together with a binder to produce a material which is water and gas permeable. This material may be used for erosion control structures in place of, or in addition to, standard rock socks, straw wattle, or other erosion control configurations.

In other embodiments, the rubber crumb material portions may be bound together with a binder to produce lightweight growing containers for plants which are gas, air, and water permeable. Crumb rubber also adds an energy insulation component to the planter pot which may contribute to improved growing performance. In still other embodiments, the rubber crumb material may be used to produce durable children's blocks or other children's toys.

A method for combining rubber crumb with a binder to mold various configurations of erosion control structures, growing containers and children's toys is also disclosed.

DETAILED DESCRIPTION

Figure 1:
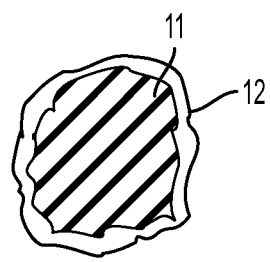
FIG. 1 is a plan view of a rubber crumb portion coated with binder.

Reference will now be made in detail to representative embodiments illustrated in the accompanying drawings and in particular with reference to FIGS. 1-21. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Those skilled in the art will readily appreciate that the detailed description given herein with respect to these Figures is for explanatory purposes only and should not be construed as limiting. Like reference numerals denote like structure throughout each of the various figures.

Referring to FIG. 1, a rubber chip 11, which may be recycled rubber crumb (styrene butadiene rubber) preferably from tires such as automotive, off road, or truck tires in one embodiment, is shown. Rubber crumb 11 may be obtained from a tire shredding process and may be partially or completely coated with a binder 12. The shredding process begins with a whole tire which is fed through a primary shredder to produce a 2" chip with the steel and fabric reinforcement still part of the chip. The 2" chips are then sent through a Rasper/Granulator which is a secondary shredder where the 2" chips are turned into a ¾" or less crumb rubber material from which steel and fabric are removed. Rubber crumb material 11 may then be screened and sized. In some embodiments ¾", ½", ¼" & 1-3 mm ground crumb rubber portions may be generated. Other sizes of crumb rubber may also be employed to make the materials described herein.

Rubber crumb 11 generally has an irregular granular shape, having been processed from recycled tires through a rasper/granulator and/or cracker mill as described above. Crumb or ground rubber is different from buffings (rubber fiber/strands) which may be obtained from recycled tires or other rubber products. Buffings are thin slivers (generally less than ¼") which are a byproduct or waste produced when the remaining worn-down tire tread is removed from a tire prior to retreading.

Figure 2:
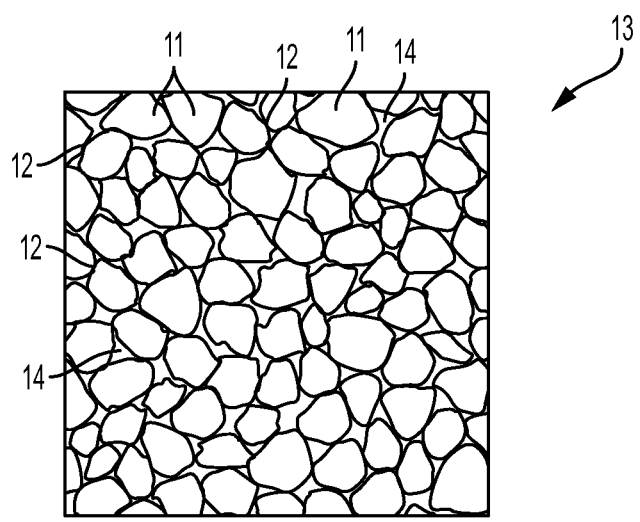
FIG. 2 is a side view of rubber crumb material.

Referring to FIG. 2, a side view of a material 13 is shown which includes rubber crumb portions 11 which are held together by binder coating 12 on the outside of crumb 11 such that crumb portions 11 bond to one another. In one embodiment, binder 12 may be Stobicoll® R 359 manufactured by Stockmeier Urethanes USA. However, binder 12 may be any polyurethane resin binder or other suitable binder. Because rubber portions 11 preferably have an irregular shape, air pockets or interstices 14 may be formed between rubber portions 11 where chip portions are not in contact with one another. The resultant material may have a compacted weight of approximately 20 pounds per cubic foot (20 lb/ft$^3$). The specific gravity of material 13 is greater than 1 with a preferred specific gravity of between 1.1 and 1.3. Thus, material 13 is not buoyant in water. Material 13 may be easily cut and formed into a variety of shapes and sizes thus facilitating its use in a variety of applications as will be further disclosed herein. In one embodiment, material 13 may have a load capacity of approximately three thousand pounds per square inch (3000 lb/int) which allows vehicular or heavy machinery traffic to pass over material 13 without deleterious effect.

The permeability of a material is a function of the ability of a liquid or gas to pass through the material. Permeability is generally measured in Darcy (d) or millidarcy (md) (1 Darcy≈$10^{-12}$ m$^2$). Compressing material 13 to a compacted weight greater than 20 lb/ft$^3$ results in a decrease in the size and quantity of interstices 14 and results in a lower permeability. Depending upon the size of rubber crumb 11 and the compression pressure, permeability of material 13 may vary up to about 75 Darcy. For example, if rubber crumb 11 is about ½" size and the mold compression is about 125 PSI, material 13 has a water permeability of about 75 Darcy while, if rubber portions are about ¼" and the mold compression is about 125 PSI, the water permeability is about 20 Darcys. Highly fractured (pervious) rock may have water permeability of 100 or more Darcys while sandstone or clay may have a water permeability of fractions of a Darcy.

Figure 3:
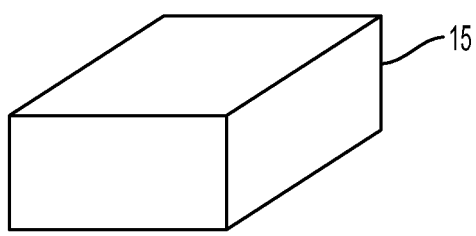
FIG. 3 is a perspective view of a molded block of rubber crumb material.

Because material 13 may be made with high water permeability, it is useful in erosion control mitigation activities, either in conjunction with, or in place of "rock socks" containing gravel or stone to prevent sediment in water runoff. Referring to FIG. 3, in one embodiment, material 13 may be made into a block 15 which may be used to anchor or space rock socks or straw wattle materials from each other or from a curb or drain. As discussed above, material 13 may be cut and formed into a variety of shapes and block 15 may be 8"×8" by 8" cube or 8"×8" by 16" block which conforms to the size of a standard cinder building block. The standard cinder block size may be used to because maintenance and construction personnel are familiar with this size and it is readily available. Of course, block 15 may be any size. The 8"×8" by 8" block 15 weighs about thirteen pounds while the standard cinder building block size weighs about 26 pounds.

Material 13 is re-usable and, when used in erosion control applications such as for inlet protection, it may be moved from one location to another without falling apart. Because it is water permeable, sediment or other particulate matter such as small stones trapped in material 13 may be removed by washing the material. That is, material 13 may be cleaned and re-used by washing the sediment or particulate matter from material 13 by soaking, rinsing, including high pressure rinsing, material 13 with water or other liquid or by using high pressure airflow or by brushing. Because material 13 is easily cut it may be sized as appropriate to fit the required erosion control or other application.

Figure 4:
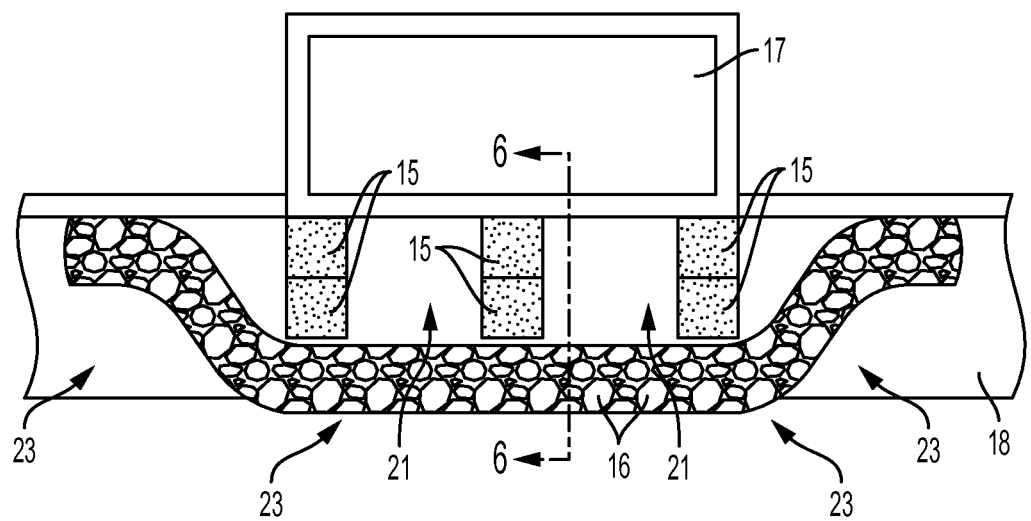
FIG. 4 is a top view of an erosion control BMP system.

Referring to FIG. 4, in one embodiment, blocks 15 may be used in conjunction with a rock sock 16. That is, blocks 15 may keep rock sock 16 spaced from a drain 17 adjacent to a curb 18 and may be used in place of cinder blocks which have been used for this purpose in certain applications. Blocks 15 are placed on curb surface 18 which may be a concrete gutter strip adjacent to an asphalt paved street to keep rock sock 16 separated from drain 17 to prevent debris or sediment from causing drain 17 to back up or become clogged. The weight and integrity of blocks 15 help to prevent them from becoming dislodged or damaged by impacts from pedestrians, vehicles or other equipment. That is, blocks 15 are more durable than cinder blocks which may crack or break when dropped or otherwise impacted by vehicles or equipment. Portions of a broken cinder block can wash into the drain and be considered a storm water contaminant and potentially block the flow of water in the drain. When used in place of cinder blocks, which are essentially water impermeable, blocks 15 also provide additional water permeability and sediment filtering and the flow of water 23 is not inhibited by blocks 15 as may otherwise be the case. This may prevent water flow 23 from damming or ponding up around blocks 15 which may otherwise occur with less water permeable cinder blocks. If water flow 23 is too great, overflow 21 may pass over rock sock 16 (over topping) and into drain 22.

Because blocks 15 may be as permeable as, or more permeable than, rock sock 16, blocks 15 could be used adjacent to drain 17 without rock sock 16. That is, referring to FIG. 5, blocks 15 could be placed in front of drain 17 without rock sock 16 in certain embodiments. Water flow 23 would then be directly through blocks 15 and into drain 17. In some embodiments, blocks 15 may extend to completely cover opening 22 such that all water flow 23 must pass through blocks 15. In some embodiments, blocks 15 may not completely cover drain opening 22 to allow overflow 21 to pass over blocks 15 and into drain 17.

Figure 6:
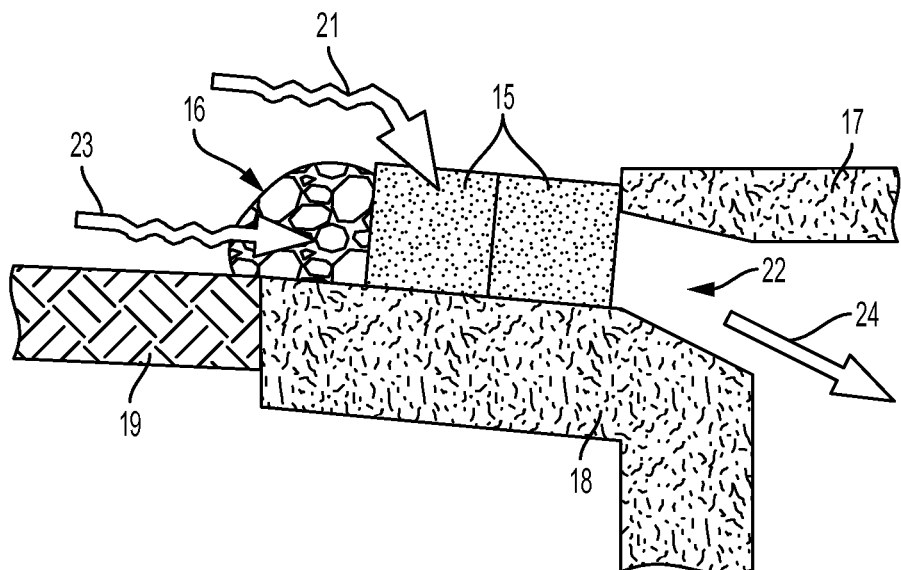
FIG. 6 is a side sectional view through line 6-6 of FIG. 4.

Referring to FIG. 6, a side sectional view through line 6-6 in FIG. 4 is shown. Blocks 15 are shown placed in front of drain 17 on curb portion 18. Rock sock 16 is held away from opening 22 in drain 17 to prevent rock sock 16 from clogging drain opening 22 and acting as a water dam if debris or dirt clogs rock sock 16. Liquid 23 which may be runoff rainwater or other liquid flow is filtered by rock sock 16 and blocks 15 such that only filtered liquid 24 is permitted to pass into drain opening 22. Dirt, sticks or other sediment is thus prevented from entering into the water drainage system and thus from polluting water drainage areas such as lakes and streams. Overflow 21 may be permitted to pass over rock sock 16 in some high flow situations such as, for example, during major storm events.

Figure 5:
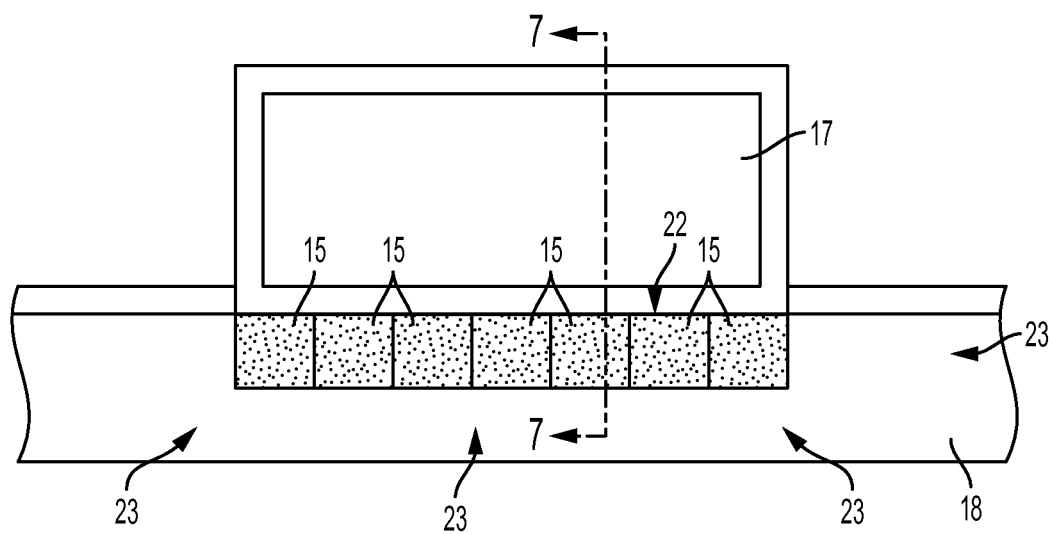
FIG. 5 is a top view of an alternate embodiment of an erosion control BMP system.
Figure 7:
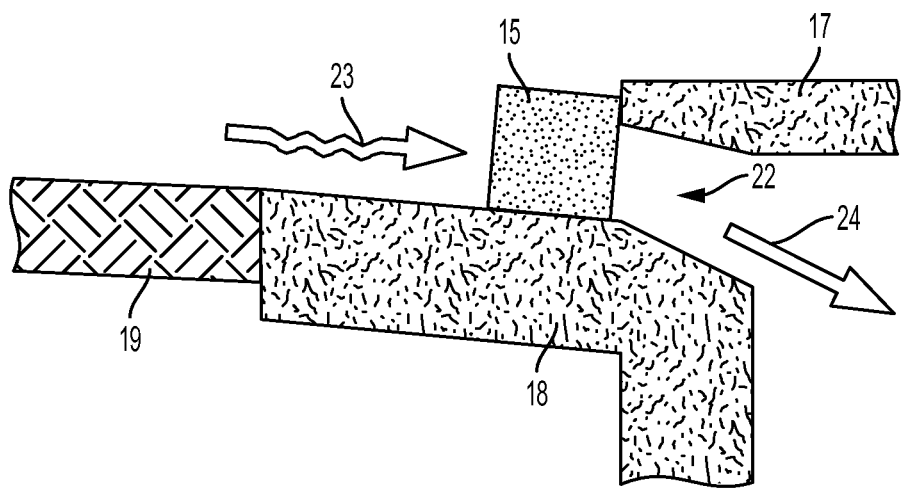
FIG. 7 is a side sectional view through line 7-7 of FIG. 5.

In the embodiment shown in FIG. 5, blocks 15 may cover the entire drain opening 22 to filter dirt and other debris from water flow 23 and prevent overflow 21 from entering drain opening 22. Referring to FIG. 7, a side sectional view through line 7-7 in FIG. 5 is shown. Blocks 15 are shown placed in front of drain 17 on curb portion 18. In this embodiment rock sock 16 is eliminated and blocks 15 form the sediment and debris filter. Liquid 23 which may be runoff rainwater or other liquid flow is filtered by blocks 15 such that only filtered liquid 24 is permitted to pass into drain opening 22. Dirt, sticks or other sediment are thus prevented from entering into the water drainage system and thus from polluting water drainage areas such as lakes and streams. In the embodiment shown in FIG. 5, blocks 15 could cover the entire drain opening 22 to filter dirt and other debris from water flow 23 and prevent overflow 21 from entering drain opening 22.

Figure 8:
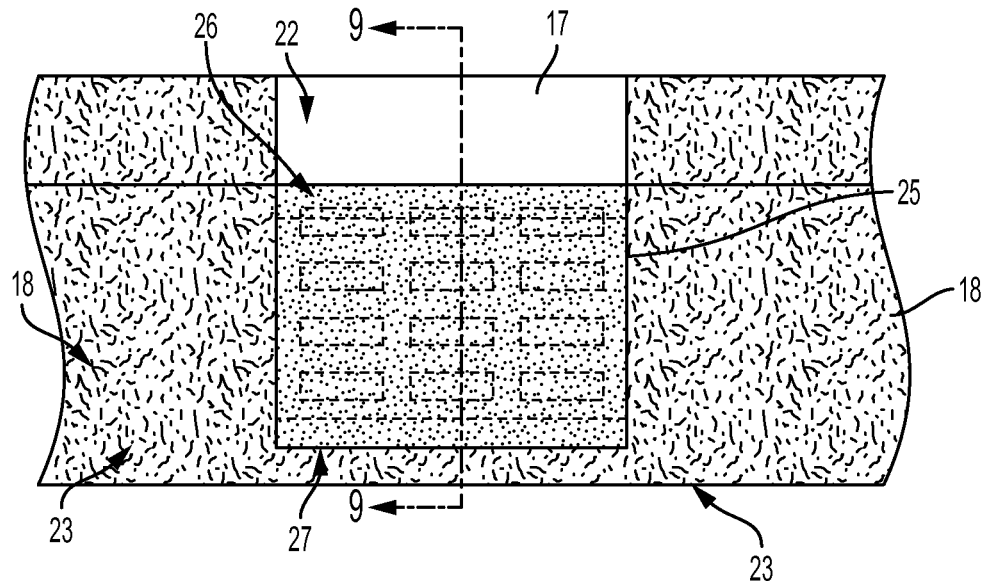
FIG. 8 is a top view of an alternate embodiment of an erosion control material adjacent a drain grate.

Referring to FIG. 8, in another embodiment, material 13 may be molded into a flat sheet 25 which may include a raised lip portion 26. Sheet or mat 25 may be placed adjacent to drain 17 and over existing inlet grate portion 27 and in front of drain opening 22 such that raised lip portion 26 at least partially covers drain opening 22. In this embodiment, water flow 23 may pass through mat portion 25 and into grate portion 27. Water flow 23 may also pass through and over (in high flow situations) raised lip portion 26 and flow into drain opening 22. In one embodiment, mat portion 25 preferably extends 2" or more beyond grate 27 onto curb 18 or pavement 19 to ensure that water flow 23 must pass through mat portion 24 and through or over raised lip portion 26 to get into drain opening 22. Sediment and other debris may thus be filtered from water flow 23 such that filtered flow 24 passes through drain opening 22 and into the storm water drainage system.

Figure 9:
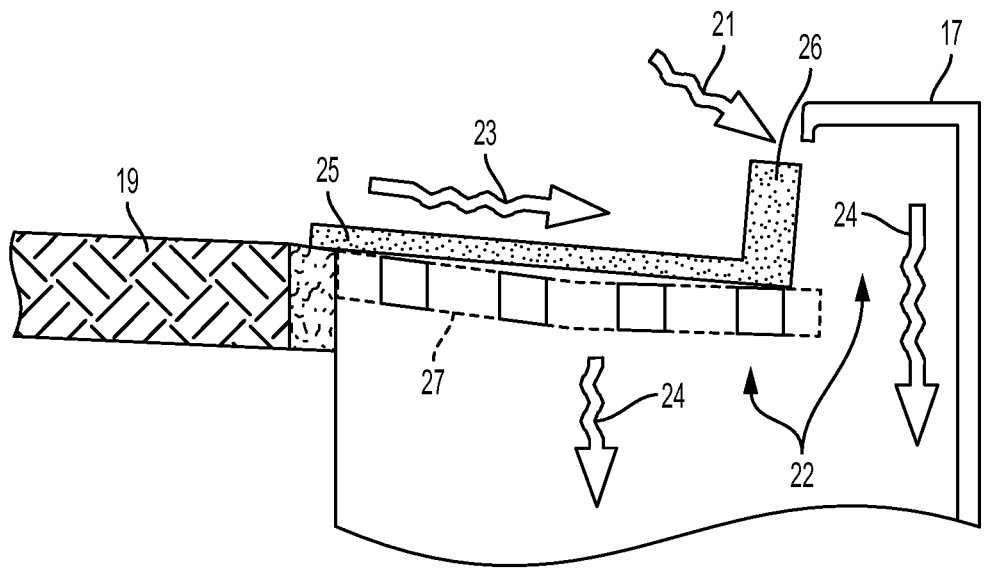
FIG. 9 is a side sectional view along the line 9-9 of FIG. 8.

Referring to FIG. 9, which is a side sectional view through line 9-9 in FIG. 8, mat 25 is shown covering grate 27 which is positioned over drain opening 22 and lip portion 26 is shown extending above mat portion 25 and into opening 22. While lip portion 26 is shown partially covering opening 22, in some embodiments lip portion may extend to drain 17 to completely cover opening 22 and prevent overflow 21. Water inflow 23 may flow through mat 24 and lip portion 26 and then though grate 27 and into opening 22. Mat 25 may be easily cut to fit over grate 27. In one embodiment, approximately two inches of mat portion 25 may extend past grate 27 onto curb 18 on the three sides of mat portion 25 other than the side adjacent lip portion 26.

Figure 10:
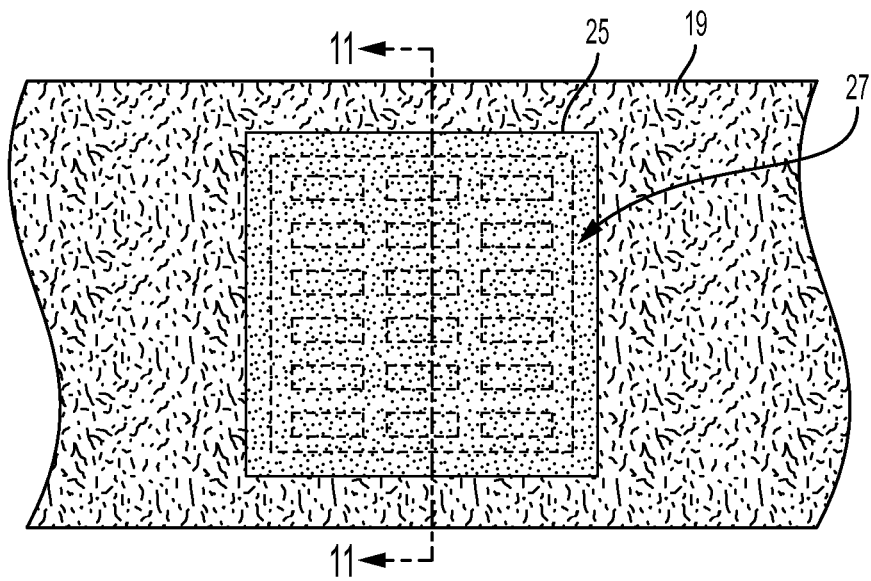
FIG. 10 is a top view of an alternate embodiment of an erosion control material over a drain grate

Referring to FIG. 10, mat portion 25 may be configured so as not to include lip portion 26 in one embodiment. In this embodiment, grate 27 is flush with street or pavement 19 or curb portion 18, adjacent or over an area inlet or a sump inlet, and covers drain opening 22 such that lip portion 26 is unnecessary and mat portion 25 may be flat and extend beyond the edges of grate 27. In one embodiment, mat portion 25 may be cut to a size which extends over grate 27 the desired distance. As stated above, in one embodiment, mat portion 25 may extend approximately two inches beyond the edges of grate portion 27. Because mat portion 25 is durable, it can be driven over by automobiles or other vehicles including heavy equipment without damaging the mat. While mat portion 25 is shown in rectangular and square configurations, it may also be circular or any other size and configuration as needed to cover the inlet.

Figure 11:
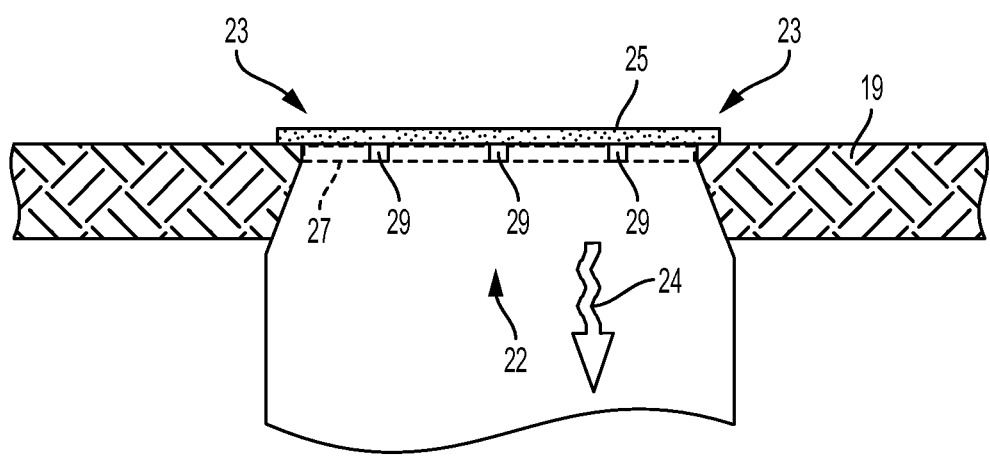
FIG. 11 is a side sectional view along the line 11-11 of FIG. 10.

Referring to FIG. 11 which is a side sectional view along line 11-11 in FIG. 10, mat portion 25 may be affixed to grate 27 by ties 29. Ties 29 can be wire ties or plastic ties or any other suitable device to affix mat portion 25 to grate 27 such that vehicle traffic or wind or water movement adjacent mat portion 25 will not dislodge mat portion 25 from grate 27. Because mat portion 25 includes interstices 14, ties 29 can easily be extended through mat portion 25 and around grate 27 to secure mat portion 25. Water flow 23 is then filtered by mat portion 25 such that the filtered flow 24 does not contain appreciable amounts of dirt or other sediment which is carried by water flow 23 from adjacent surfaces such as construction sites or unpaved dirt surfaces.

Figure 12:
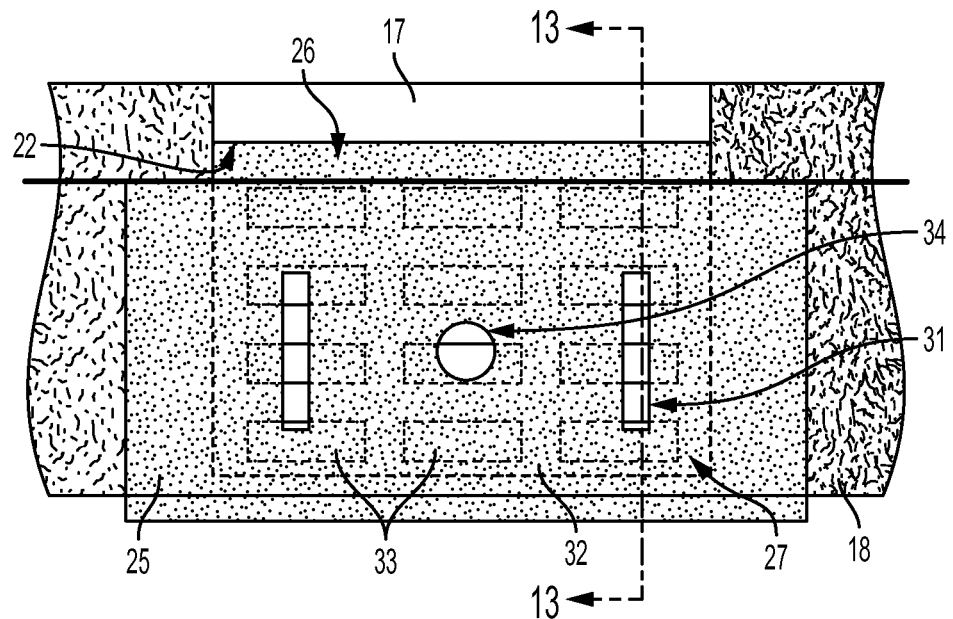
FIG. 12 is a top view of an alternate embodiment of an erosion control material over a drain grate.

Referring to FIG. 12, in another embodiment, material 13 may be molded into a curb catcher device for use in combination drains which may fit over grate 27 on curb and gutter 18. This embodiment includes mat portion 25 and lip portion 26 adjacent to drain 17 and drain opening 22. Mat portion 25 may include attachment strips 31. In one embodiment, strips 31 may be Velcro® strips which attach to grate 27. Grate 27 includes solid portion 32 and openings 33 to allow water or other liquids to pass through. Strips 31 may extend through openings 33 and around solid portion 32 to secure mat portion 25 to grate 27. While solid portion 32 may be cast iron or other metal, solid portion 32 may be made of any suitable material. In one embodiment, mat portion 25 includes a marker hole 34 into which a marker device may be inserted to identify the location of mat portion 25 and grate 27 such that vehicular, pedestrian or other traffic may be made aware that grate 27 and drain opening 22 are located there.

Figure 13:
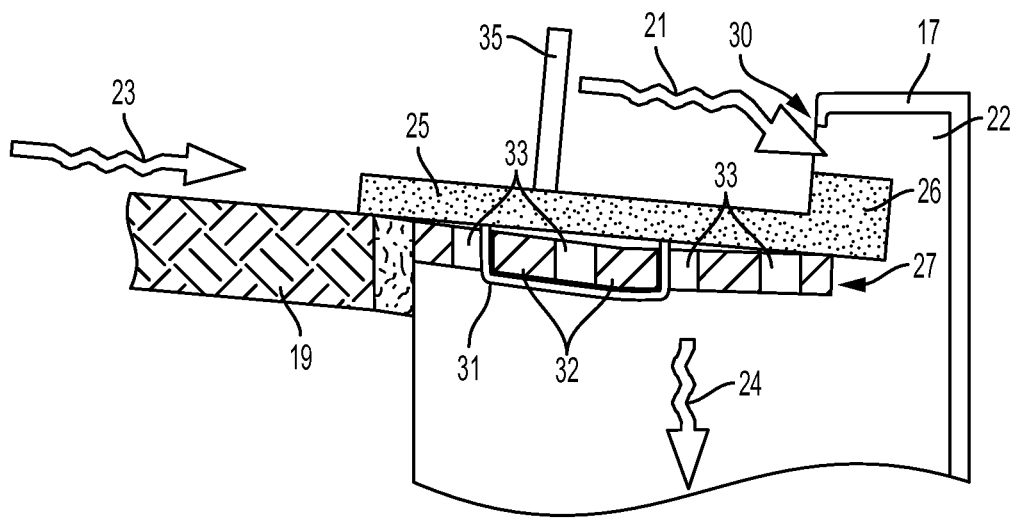
FIG. 13 is a side sectional view along the line 13-13 of FIG. 12.

Referring to FIG. 13, a side sectional view taken along the lines 13-13 in FIG. 12 is shown. Mat portion 25 is attached to solid portion 32 of grate 27 by strip 31 which may, in one embodiment, be passed through openings 33 in grate 27 to securely attach mat portion 25. A marker device, which may be a brightly colored tubular marker 35 may be placed into marker hole 34 to identify mat portion 25 affixed to grate 27 such that vehicular, pedestrian or other traffic may be made aware that grate 27 and drain opening 22 are located there. Marker hole 34 may be included in any of the embodiments described herein to accommodate a marker 35. Liquid 23 may flow over pavement 19 and onto mat portion 25 and against lip portion 26 such that soil or other debris may be filtered by mat portion 25 and lip 26 in order that filtered flow 24 does not contain sediment or other debris which could otherwise flow into the storm water system and lakes or streams connected thereto. A gap 30 between lip 26 and drain 17 permits overflow 21 to pass through if water flow 23 is too large to be conducted through mat 25, lip 26 and grate 27 in high flow situations. In some embodiments, lip portion 26 may be made to contact or extend above drain 17 to eliminate gap 30 and cover drain opening 22 to prevent overflow 21 from entering drain opening 22.

Figure 14:
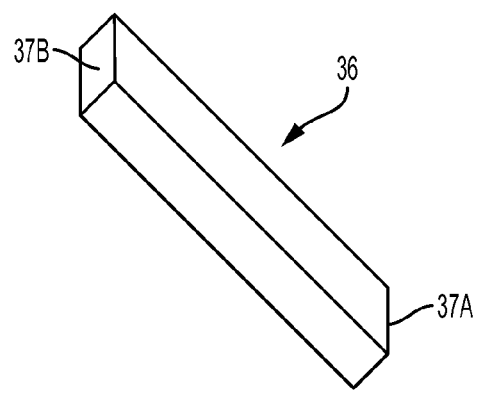
FIG. 14 is a perspective view of an alternate embodiment of an erosion control structure.

Referring to FIG. 14, in another embodiment material 13 may be molded into a strip 36. Strip 36 may, in one embodiment, include end portions 37A and 37B formed at each end of strip 36. This configuration of material may be useful for check dams and perimeter control as well as inlet protection. Ends 37 A and B may be angled as shown or they may be squared off (an angle of 0° or 90°) such that an end 37A or B of one strip 36 may abut an end 37A or B of another strip 36 to form a continuous length of strip portions 36.

Figure 15:
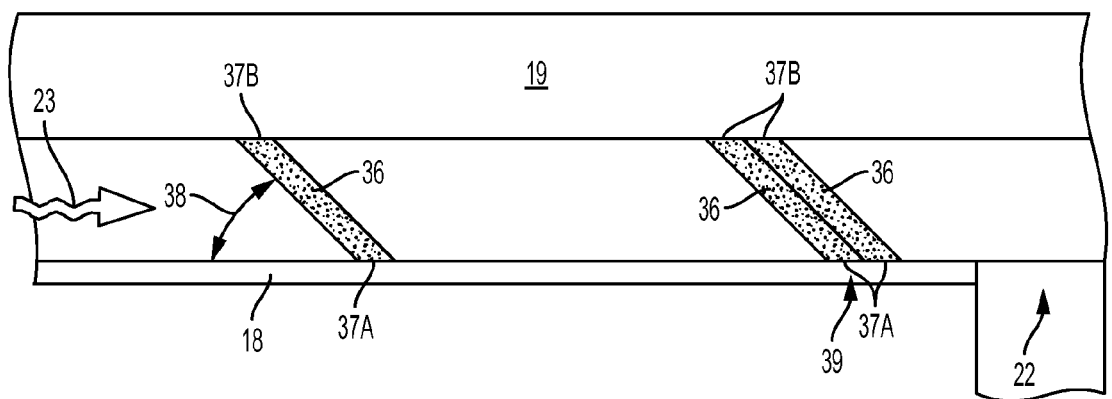
FIG. 15 is a top view of the structure of FIG. 14 in an erosion control configuration.

Referring to FIG. 15, in one embodiment, strip portions 36 may be placed along curb 18 at an angle of about 45° in one embodiment such that ends 37A which may be angled at about 45° abut curb 18 such that ends 37A are substantially parallel to curb 18 when strips 36 are placed at an angle to curb 18. Ends 37B then abut and are substantially parallel to pavement 19. Of course, the angle could be varied depending upon the application and strips 36 may be easily cut to any configuration. Water flow 23 along curb portion may be filtered through strip 36. One or more strips 36 may be placed at various intervals along curb 18 depending upon the grade of curb 18. For example, in one embodiment, if the grade of curb 18 is less than 1%, strips 36 may be placed at intervals of 100 feet while for grades of 6% or more strips 36 may be placed at intervals of 25 feet or less. Strips 36 may be placed closer together as liquid flow 23 approaches curb inlet 22. More than one strip 36 may be used adjacent curb inlet 22 as shown at point 39 in some embodiments. Placement and spacing of strips 36 may be varied in various embodiments depending upon the grade and application as well as expected water flow.

Figure 16:
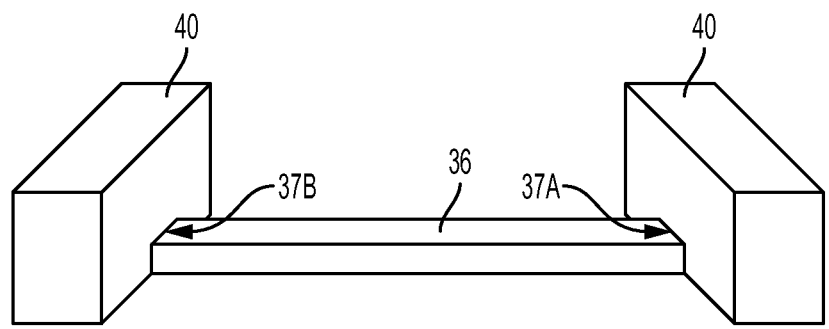
FIG. 16 is a perspective view of an alternate embodiment of an erosion control structure.

Referring to FIG. 16, in some embodiments, one or more strips 36 which include block portions 40 at each end may be used in various configurations adjacent curb inlet 22. The inclusion of block end portions 40 over end portions 37A/B may allow multiple strips 36 to be placed adjacent drain 17 as will be shown and described with respect to FIG. 18. Block 40 may act as both a spacer device to space strips 36 from the inlet 22 and to interlock strips 36 together to prevent movement of strips 36 with respect to each other, to the inlet 22, and to a curb 18 or other pavement adjacent inlet 22.

Figure 17:
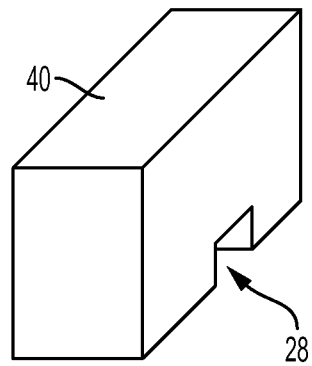
FIG. 17 is a perspective view of a portion of the structure of FIG. 16.

Referring to FIG. 17, block end portion 40 is shown with a notch or cut out portion 28 sufficient to allow ends 37A/B of strips 36 to fit therein and form the embodiment shown in FIG. 16. In other embodiments, multiple strip portions 36 may be connected by block portions 40. End portions 37A/B, which may be angled or not, may abut end portions 37A/B of another strip portion 36 within notch portion 28 such that multiple strip portions 36 may be joined or interlocked by block portions to form an erosion control system.

Figure 18:
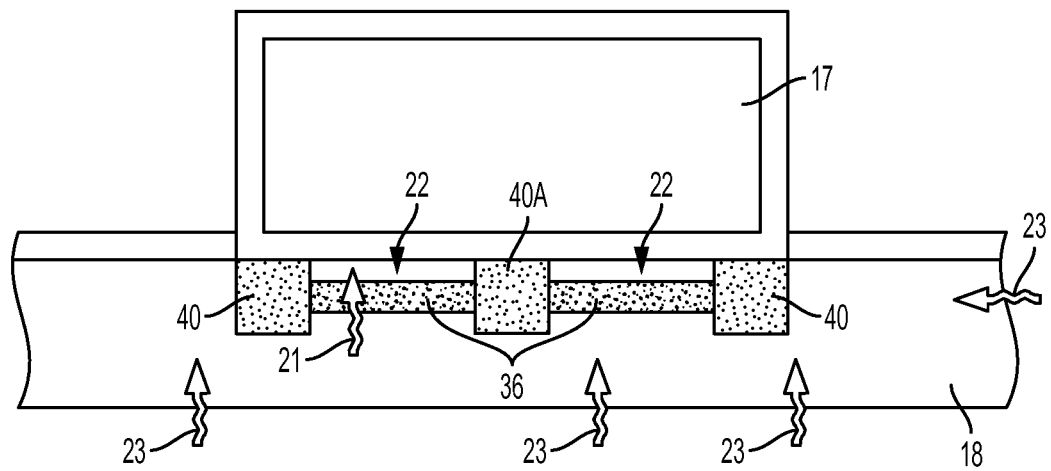
FIG. 18 is a top view of the structure of FIG. 16 in an erosion control configuration.

Referring to FIG. 18, strip 36 with block portions 40 could be placed in front of drain 17 without rock sock 16 or any additional BMP in certain embodiments. Water flow 23 would then be directly through blocks 40 and strips 36 into drain 17. In some embodiments, blocks 40 may extend over opening 22 to secure the device against drain 17 such that water 23 must pass through strip 36 and blocks 40. In some embodiments, strips 36 will not completely cover drain opening 22 to allow overflow 21 to pass over strips 36 and into drain opening 22. As described above, two (or more) strip portions 36 may be interlocked by block portions 40 to form an inlet protection system to protect inlet opening 22. That is, ends 37A/B of strip portions 36 abut one another in notch 28 of a block 40 such as the center block 40A in FIG. 18. The size and weight of block 40A functions to retain interlocking ends 37A/B of strip portions 36 and prevent them from separating such that the system remains intact. Notch 28 of blocks 40 retain the other end 37A/B of strips 36 or may be used to join additional strips 36.

Figure 19:
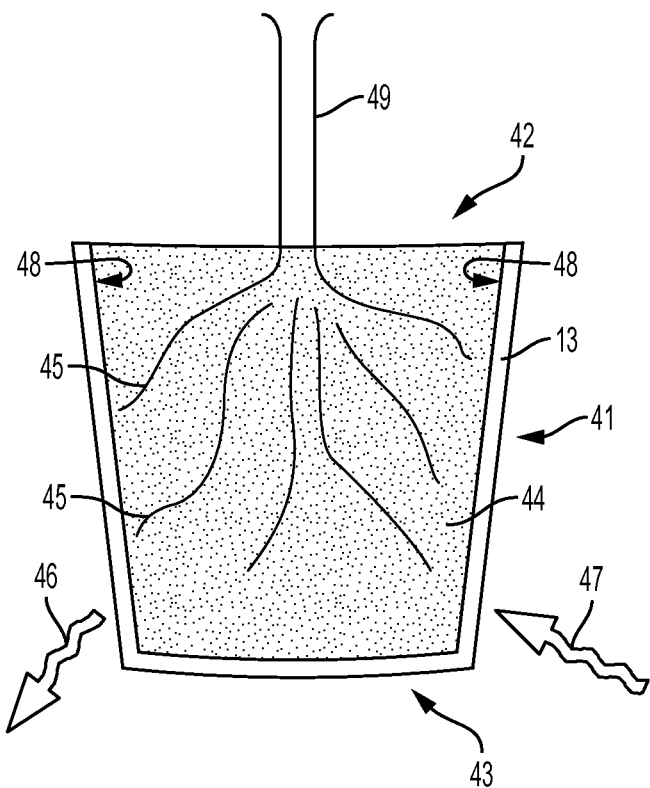
FIG. 19 is a side section view of a growing container made from a rubber crumb material.

Referring to FIG. 19, in another embodiment, material 13 may be molded into a growing container 41. Container 41 may take any form including a conventional circular container with larger diameter opening 42 at the top and smaller diameter closed end 43 at the bottom. Container 41 is shown with soil 44 therein and root system 45 of a plant 49 growing therein. Container 41 is made of material 13 allowing liquid and air permeability. The size of crumb rubber portions 11 in container 41 is smaller than for the erosion control applications discussed above. Storm water erosion control products described above in FIGS. 3-16 may handle large volumes of water for storm events so a ½" chip 11 may preferably be used to achieve higher permeability as larger sizes of crumb portions 11 result in higher permeability for material 13. In other embodiments, other size chip portions such as ⅜" chip portions may be used. Material 13 for planter container 41 may include a ¼" and/or a 1-3 mm (3/64-9/64 inch) size chip. Planter container 41 will have less water running through it and a finer soil 44 to contain within it compared to erosion control applications such as construction sites so smaller rubber nugget chip portions 11 may be used for this embodiment. Container 41 thus allows water drainage 46 therefrom and airflow (or carbon dioxide or other gas release) 47 therein such that root system 45 may be permitted to grow adjacent to inside edges 48 of container 41 without wrapping around the inside 48 of container 41 and becoming pot bound as with conventional solid material pots. In addition, material 13 with interstices 14 may act as insulation to better maintain the temperature of soil 44 and aid the growing of root system 45.

Figure 20:
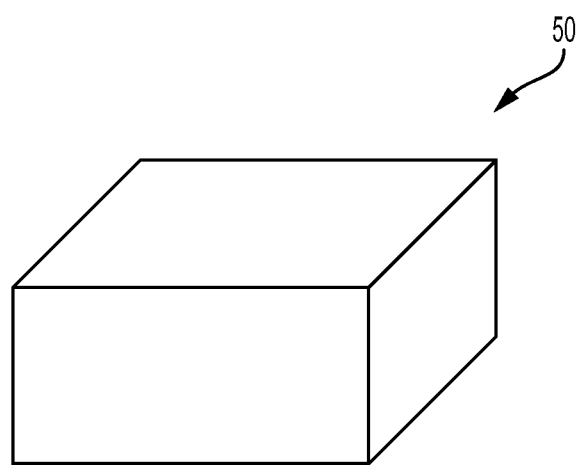
FIG. 20 is a perspective view of a cubical block.

Referring to FIG. 20, in another embodiment, a cubical block 50 may be formed from material 13. Block 50 is shown substantially in a cube configuration as previously shown in FIG. 3 but it should be appreciated that block 50 may take any shape including geometric shapes such as spheres, pyramidal, conical, rectangular and the like as needed for various applications and uses. Block 50 may be used for erosion control applications as described herein or a geometric shape block may find other uses such as a child's plaything including as a building block. Because, block 50 is made from material 13, it is resilient and may be used without risk of serious injury if thrown or otherwise inadvertently contacting a child, an animal or other surface. The size of rubber portions 11 used to form block 50 and the size of block 50 may be varied to achieve the desired weight and density for block 50. For example, a 2"×2"×2" block 50 made from the same material 13 as used to mold the block described in FIG. 3, would weigh about 3½ ounces and would be suitable as a child's toy. It may be appreciated that blocks 50 may be molded from any size rubber portion 11 to achieve a desired weight and density. Block 50 may be stacked or otherwise utilized as is done with standard wooden or solid rubber children's blocks. Blocks 50 may be cleaned by rinsing, or soaking blocks 50 in water as described above with respect to blocks 15.

Figure 21:
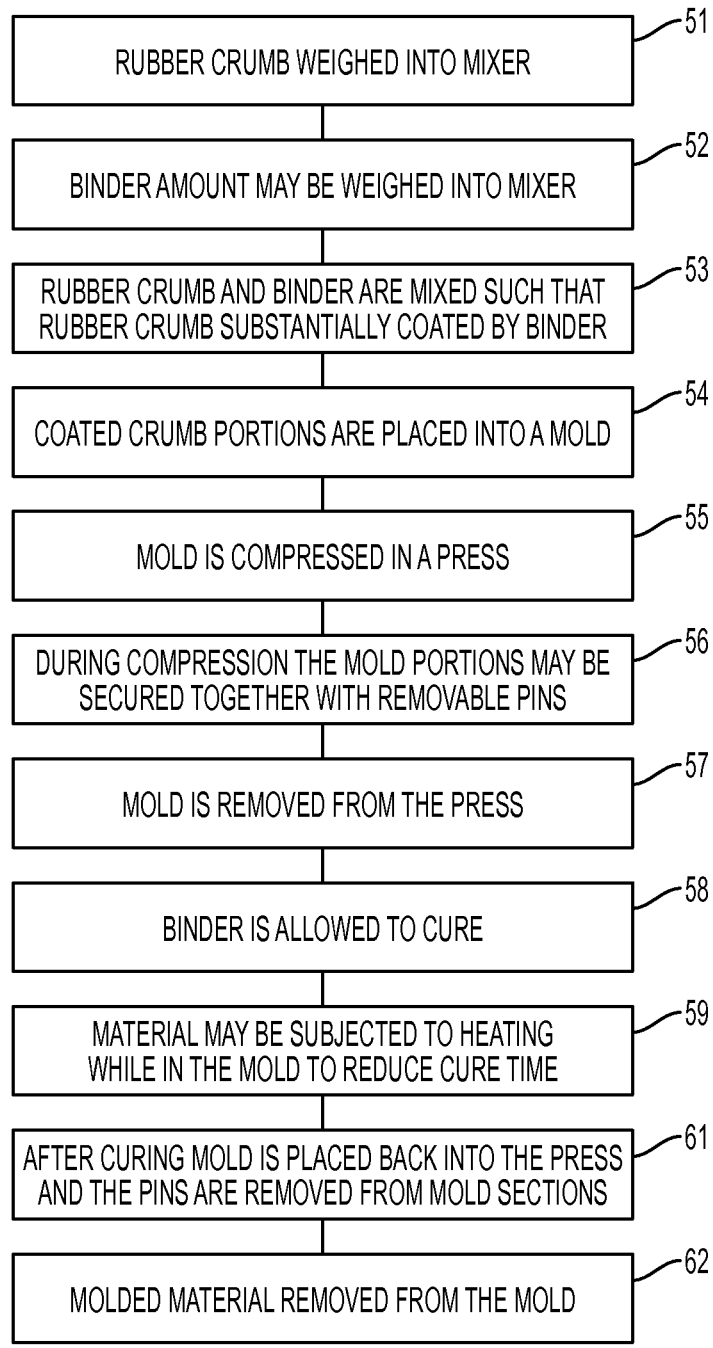
FIG. 21 is a flow chart illustrating the operations for making a rubber crumb material.

Referring to FIG. 21, a flow chart disclosing a compression molding method for molding material 13 into useful configurations including those disclosed above is shown. In one embodiment the mold used in the molding process may be made of High Density polyethylene (HDPE) or High Density Polypropylene (HDPP) plastic or other material. In operation 51, rubber crumb portions 11 are weighed in an amount depending upon the desired type and size of the molded product and the portions 11 are added to a mixer. In operation 52, a binder amount may be weighed which, in some embodiments, may be 10-15% by weight of the weight of the rubber portions 11 and the binder is added to the mixer. In operation 53, rubber portions 11 and the binder 12 are mixed in a mixing process along with water in an amount about 1% by weight of rubber portions 11 such that rubber portions 11 are substantially coated by binder 12. The optional addition of water assists in coating rubber portions 11 with binder 12 by reducing viscosity of the binder 12 and increases the cure time of the binder 12.

The mixing process in operation 53 continues until rubber portions 11 are thoroughly coated with the binder 12. This may be about 5-10 minutes in some embodiments. In operation 54, the coated portions are placed into a mold and in operation 55, the mold portions are compressed in a press at about 125 PSI. During the compression process in operation 55, the mold may be secured by affixing the mold portions together with removable pins or other securing devices in operation 56. The mold is then removed from the press in operation 57 and the binder 12 is allowed to cure in operation 58. The approximate cure time may be 90-120 minutes for the polyurethane binder 12. In some embodiments, in optional operation 59, material 13 may be subjected to heating while in the mold to reduce binder cure time. After curing is complete, in operation 61, the mold is placed back into the press and the pins or other securing devices which were inserted in operation 56 are removed and the molded material 13 is removed from the mold in operation 62.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings. For example, while certain sizes, amounts, pressures and time have been disclosed in certain embodiments to prepare material 13, it should be expressly understood that properties of material 13 may be varied by varying different manufacturing parameters.

I claim:

1. A movable erosion control structure comprising:
   a plurality of crumb rubber portions;
   a binder coated on the plurality of crumb rubber portions;
   the coated crumb rubber portions are molded to adhere each of the coated crumb rubber portions to at least another one of the coated crumb rubber portions to form a resilient, movable erosion control structure with a density of between about 20 lb./cu ft. to about 48 lb./cu. ft.; and
   whereby interstices are formed between at least some of the adhered crumb rubber portions to permit water and gas to pass therethrough while retaining at least some particulate matter
   whereby the resilient movable erosion control structure may be placed on a surface.

2. The movable erosion control structure of claim 1 wherein the binder includes a polyurethane resin binder.

3. The movable erosion control structure of claim 1 wherein the crumb rubber portions are approximately between ¼ to about ¾ inch crumb rubber.

4. The movable erosion control structure of claim 1 wherein the molded coated crumb rubber portions include a mat portion which may be substantially rectangular, square, or circular.

5. The movable erosion control structure of claim 4 wherein the mat portion includes a lip portion along at least a portion of an edge of the mat portion.

6. The movable erosion control structure of claim 4 wherein the mat portion includes attachment strips to connect the mat portion to at least one of: a grate; an erosion control structure; a drain inlet; a pavement surface; or a drain opening.

7. The movable erosion control structure of claim 1 wherein the movable erosion control structure includes an identification device attachable to the movable erosion control structure.

8. The movable erosion control structure of claim 1 wherein the molded coated crumb rubber portions include:
   a first block portion including a notch in the first block portion; and
   a first strip portion including an end engageable with the notch.

9. The movable erosion control structure of claim 8 further including a second strip portion including an end engageable with the notch whereby the end from the first strip portion and the end from the second strip portion abut in the notch.

10. The movable erosion control structure of claim 9 further including:
    a second block portion including a notch; and
    a third strip portion including an end engageable with the notch;
    whereby the end on the third strip portion abuts a second end of the second strip portion opposite to the end of the second strip portion which abuts the end of the first strip portion, the end portions of the second and third strip portions abut in the notch of the second block portion.

11. The movable erosion control structure of claim 1 wherein the molded coated crumb rubber portions include a rectangular strip with angled edge portions on opposite edges of the rectangular strip.

12. A resilient erosion control mitigation material comprising:
   a plurality of crumb rubber portions;
   a binder coated on the plurality of crumb rubber portions;
   the coated crumb rubber portions compressed to a density of between about 38 lb./cu ft. to about 48 lb/cu. ft. and including interstices formed between at least some of the molded coated crumb rubber portions to form the resilient erosion control mitigation material; and
   whereby the compressed coated crumb rubber portions form a resilient structure movably placed above a surface to permit water to pass through the structure and to filter sediment and debris from the water.

13. A method for making an erosion control mitigation structure comprising the steps of:
   weighing crumb rubber portions into a mixer;
   weighing a binder into the mixer;
   mixing the crumb rubber portions with the binder to coat the crumb rubber portions;
   placing the coated crumb rubber portions into a mold;
   compressing the mold to form a resilient erosion control mitigation structure having a density of between about 38 lb./cu ft. to about 48 lb/cu. ft.;
   curing the binder; and
   removing the resilient erosion control mitigation structure from the mold.

14. The method of claim 13 wherein the step of weighing binder into the mixer includes adding about 1 part water.

15. The method of claim 13 wherein the step of compressing includes securing mold portions together with one or more removable securing devices.

16. The method of claim 13 wherein the step of curing includes heating the crumb rubber portions and the binder in the mold.

17. The method of claim 13 further including the step of placing the erosion control mitigation structure adjacent to a surface including at least one of: a pavement surface; a drain opening; a grate; a curb; or a construction site.

18. The method of claim 13 further including the step of cleaning the erosion control mitigation structure by at least one of: washing; soaking; rinsing; high pressure water rinsing; brushing; or high pressure airflow.

19. The method of claim 13 wherein the step of compressing the mold includes compressing at about 125 PSI.

20. The method of claim 13 wherein the step of weighing the binder includes an amount of binder of about 10-15% by weight of the weight of the rubber portions.

21. The movable erosion control structure of claim 1 wherein the density is between about 38 lb./cu ft. to about 48 lb/cu. ft.

\* \* \* \* \*